United States Patent [19]

Thaller et al.

[11] Patent Number: 5,274,628
[45] Date of Patent: Dec. 28, 1993

[54] MULTISIGNAL SYNCHRONIZER WITH SHARED LAST STAGE

[75] Inventors: Kurt M. Thaller, Acton; Nitin D. Godiwala, Boylston, both of Mass.

[73] Assignee: Digital Equipment Corporation, Maynard, Mass.

[21] Appl. No.: 874,243

[22] Filed: Apr. 24, 1992

[51] Int. Cl.$^5$ .............................. H04J 3/06; H04L 7/00
[52] U.S. Cl. .................................. 370/47; 370/100.1; 375/106; 307/480
[58] Field of Search ................. 370/41, 43, 47, 100.1, 370/112, 113; 375/106, 110; 307/269, 480; 328/137, 154

[56] References Cited

U.S. PATENT DOCUMENTS

| | | | |
|---|---|---|---|
| 4,648,102 | 3/1987 | Riso et al. | 375/106 |
| 4,935,942 | 6/1990 | Hwang et al. | 375/106 |
| 4,984,255 | 1/1991 | Davis et al. | 375/106 |
| 5,128,970 | 7/1992 | Murphy | 375/106 |
| 5,155,745 | 10/1992 | Sugawara et al. | 375/110 |

Primary Examiner—Douglas W. Olms
Assistant Examiner—Alpus H. Hsu
Attorney, Agent, or Firm—Kenyon & Kenyon

[57] ABSTRACT

A N-stage synchronizer for generating a synchronous signal that is derived from multiple sources. The synchronizer has an edge detector and N−1 stages for each asynchronous source signal. The outputs of the N−1 the synchronizer stages are processed according to an OR function. After the OR function, the merged asynchronous source signals are input to the shared last synchronizer stage. The output of the last synchronizer stage is the synchronous signal. The N-stage synchronizer reduces capacitance associated with the synchronizer and, therefore, lessens the time to assert or deassert the synchronous signal, and reduces the time necessary to generate the synchronous signal.

25 Claims, 3 Drawing Sheets

MULTISIGNAL SYNCHRONIZER WITH SHARED LAST STAGE

FIELD OF THE INVENTION

The present invention relates to N-stage synchronizers. More particularly, the present invention relates to N-stage synchronizers for use with multi-source signals.

BACKGROUND OF THE INVENTION

Computer systems often operate together. To do so, they are connected through an interface. This interface may have a synchronizer to ensure that the signals generated by one system are synchronized in the time domain with signals of a second system so that communications between the two systems is effected.

When conventional synchronization methods have been used, the synchronized signals, in many cases, could not be input to the destination system because the proper set-up and hold time limitations could not be met since such destination systems had critical timing limitations for such synchronized signals. This becomes even more complicated if the synchronous signals have multiple asynchronous sources. More specifically, each of the multiple asynchronous sources that were used to generate the synchronous signal has its own synchronizer and the output of these synchronizers are input to an OR gate. The OR gate function delayed the synchronous signal even more and made meeting the set-up and hold time requirements even more difficult.

A synchronizing circuit of the type just described is shown in FIG. 1 generally at 100. The multiple asynchronous sources for generating synchronous signal 124 are ASYNC SOURCE A signal 102, ASYNC SOURCE B signal 110, and ASYNC SOURCE C signal 116. The synchronization of each of these asynchronous source signals is carried out by a two step synchronizer consisting of two D-type flip-flops. ASYNC SOURCE A signal 102 is synchronized by series connected flip-flops 104 and 108, ASYNC SOURCE B signal 110 by series connected flip-flops 112 and 114, and ASYNC SOURCE C signal 116 by series connected flip-flops 118 and 120. All of these flip-flops are clocked by the destination system clock signal 106.

The outputs of last stage flip-flops 108, 114, and 120 are input to OR gate 122. Each of these output signals has been synchronized in the time domain of the destination system. The output of OR gate 122 is synchronous signal 124 which is synchronized in the time domain of the destination system except for the delays associated with carrying out the OR function.

To minimize the delays caused by the OR function, ideally, the last stage flip-flops 108, 114, and 120 of the respective synchronizers are placed as physically close to the destination system as possible. This assists in reducing the capacitance between the systems and, thus, the time necessary to assert and de-assert the synchronized signal. However, this method of reducing delays becomes difficult when each of the multiple sources has its own synchronizer because only the OR gate, such as OR gate 122, can be placed next to the destination system because of physical constraints of any system implementing a circuit such as that shown in FIG. 1. Moreover, the greater the number of multiple sources, the greater the distance the last stages of the separate synchronizers will be from the destination system. The lengthening of the distance that the last stage flip-flops are from the destination system also adds to the timing of synchronous signal 124 and makes meeting the set-up and hold time requirements even more difficult.

This same problem exists in a bit-sliced integrated circuit. For example, a particular pin of the circuit may assume several functions depending on its assigned "personality", and each of these functions may require an on-chip synchronizer. The timing problem described above will then occur with respect to the timing delays associated with the OR function and the last stages of the synchronizers of the number of multiple sources being able to be in close proximity to an output driving pin.

The present invention overcomes these and other problems as set forth in the remainder of the specification and referring to the attached drawings.

SUMMARY OF THE INVENTION

The present invention is a N-stage synchronizer for providing a synchronous signal, which is derived from multiple sources which are asynchronous with the time domain of a destination system. The synchronizer reduces the delays associated with the synchronization process caused by an OR function. The synchronizer of the present invention also reduces the problems associated with meeting the critical timing requirements at the destination system, such as set-up and hold timing.

The N-stage synchronizer of the present invention generates a synchronous signal from multiple asynchronous sources. Each source signal is asynchronous with the destination clock domain. The synchronizer has at least a separate first synchronizer stage for each of the multiple asynchronous sources.

Because the clock domain of the input source signals can be of a sufficiently different rate from that of the destination clock domain, an input source signal could be missed, or seen by more than one synchronizer. An edge detector for each source signal ensures that each source signal is not lost if there is an alignment of clock pulses.

The OR function is performed between two stages of the N-stage synchronizer and preferably between the last two stages which results in a shared last stage. There are time delays associated with the OR function being performed before the last stage, but this only affects the reliability of the synchronizer slightly by taking away some of set-up time from the last stage. This is outweighed by the fact that the last stage can be placed close to the destination system thus reducing capacitance and, hence, the time necessary to assert or de-assert the synchronous signal. Furthermore, the final synchronous signal is generated quicker than it would be generated using prior art methods.

The present invention will be described in detail in the remaining portion of the specification making references to the drawings.

DETAILED DESCRIPTION OF THE INVENTION

The present invention is a N-stage synchronizer that has a shared last step that is used for generating a synchronous signal that is derived from multiple asynchronous sources.

Figure 1:
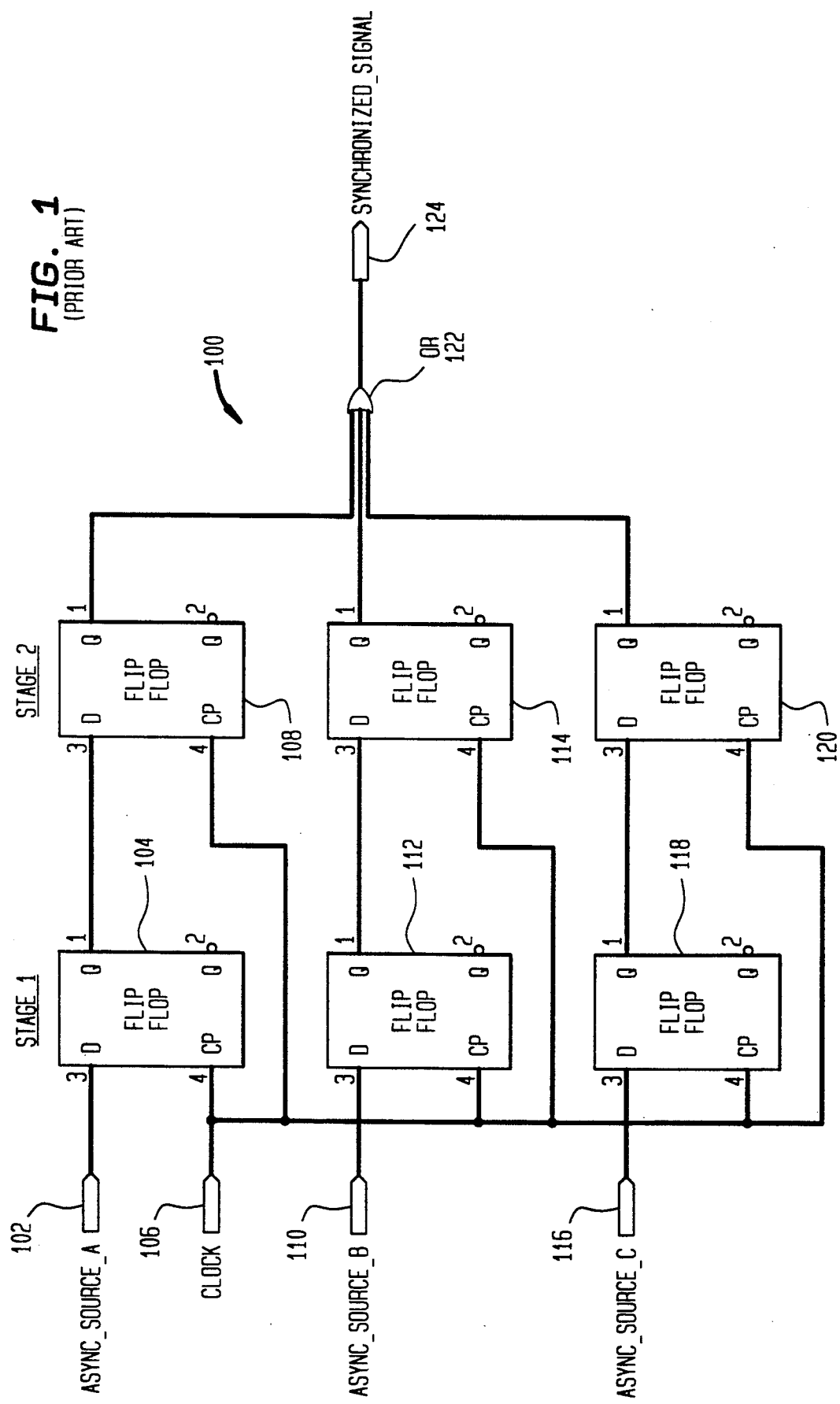
FIG. 1 is a prior art synchronizer for generating a synchronous signal that is derived from multiple asynchronous sources.
Figure 2:
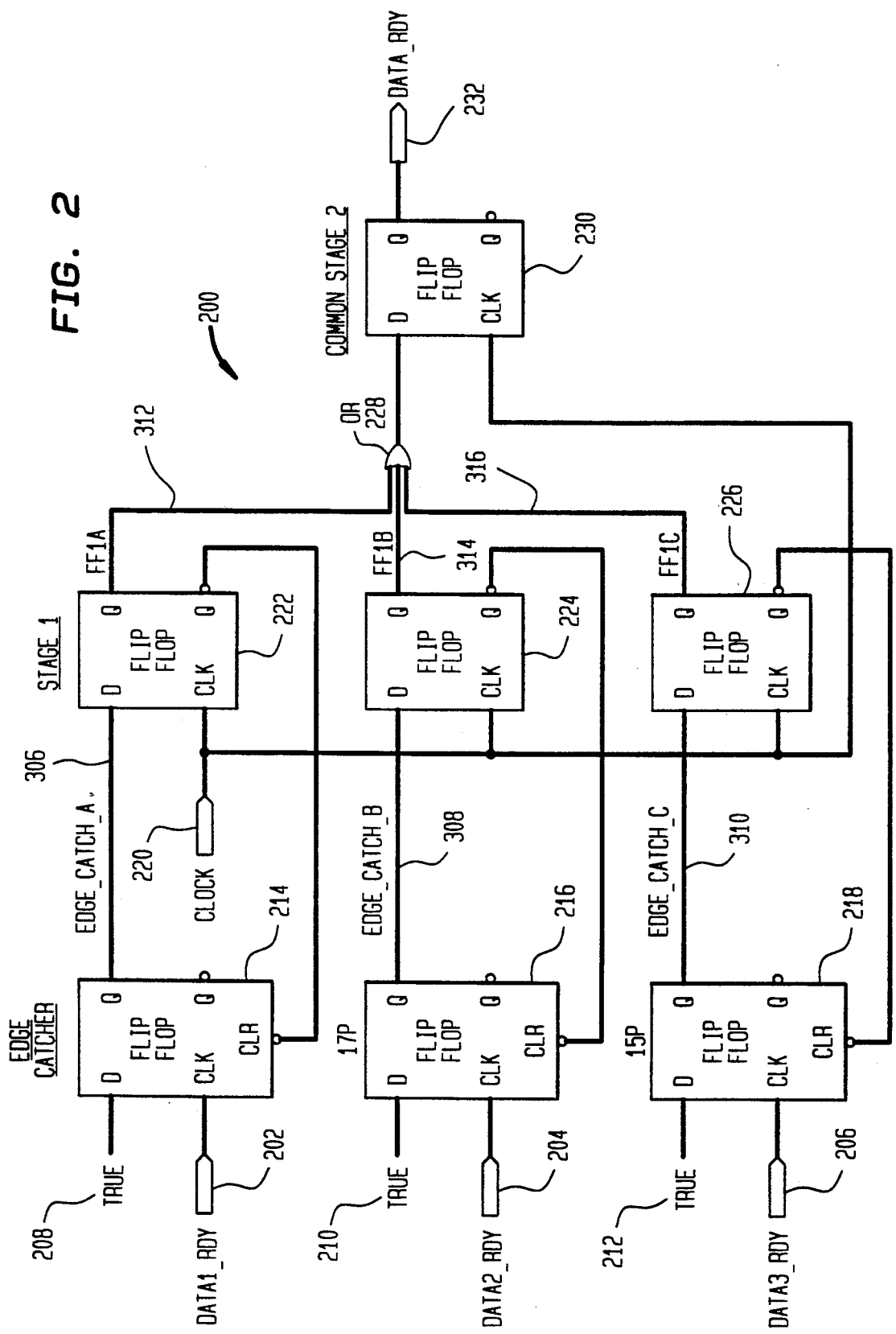
FIG. 2 is the synchronizer of the present invention for generating a synchronous signal that is derived from multiple asynchronous sources.

Referring to FIG. 2, the N-stage synchronizer of the present invention is shown generally at 200. FIG. 2 only shows two stage synchronizer 200, however, it is understood that synchronizer 200 may have many more stages.

DATA_RDY signal 232 is derived from multiple data ready signals from sources asynchronous to destination system clock signal 220. These are DATA-1_RDY signal 202, DATA2_RDY signal 204, and DATA3_RDY signal 206. It is understood that there may be any number of asynchronous source signals from which DATA_RDY signal 232 is derived.

The data line (not shown) is a path external to the synchronizer of the present invention. Each data package is sequential on the data line. A data package may be 128 bits wide, however, the bit size is not limiting with respect to the present invention. The data ready signals 202, 204, and 206 are asserted at fixed intervals based on the clock domain of the source system. There is a data ready signal associated with each data package. DATA_RDY signal 232 is asserted whenever it is valid to accept data from the data line into the destination system, as determined by the present invention.

According to the present invention, there is an edge detector associated with each data ready source signal. As shown in FIG. 2, these are edge detectors 214, 216, and 218. DATA 1_RDY signal 202 is input to the clock input of edge detector 214, DATA 2_RDY signal 204 is input to the clock input of edge detector 216, and DATA 3_RDY signal 206 is input to the clock input of edge detector 218. The input to the data input of each of the edge detectors is a TRUE signal. As shown, TRUE signal 208 is input to the data input of edge detector 214, TRUE signal 210 is input to the data input of edge detector 216, and TRUE signal 212 is input to the data input of edge detector 218. The output of edge detector 214 is EDGE_CATCH_A signal 306 which is input to the D input of flip-flop 222, the output of edge detector 216 is EDGE_CATCH B signal 308 which is input to the D input of flip-flop 224 and the output of edge detector 218 is EDGE_CATCH_C signal 310 which is input to the D input of flip-flop 226. Each of the edge detectors is cleared by the signal output from the inverting output of a stage flip-flop associated with a particular edge detector.

Edge detector 214, 216, and 218 may be used to detect the rising or falling edge of a signal. However, in FIG. 2, preferably each edge detector is used to detect the rising edge of the input source signal.

First stage flip-flop 222 is clocked by destination system clock signal 220. Flip-flop 222 is clocked on an edge of clock signal 220, and the output of flip-flop 222 is the first input to OR gate 228. Preferably, flip-flop 222 is a D-type flip-flop.

First stage flip-flop 224 also is clocked by destination system clock signal 220. When clocked, the output of flip-flop 224 is the second input to OR gate 228. Preferably flip-flop 224 also is a D-type flip-flop.

In a similar fashion, first stage flip-flop 226 is clocked by destination system clock signal 220. The output of flip-flop 226 is the third input to OR gate 228. This flip-flop also is preferably a D-type flip-flop.

OR gate 228 performs the OR function with regard to the three input signals. There is time delay associated with OR gate 228 performing its OR function. This delay has a slight impact on the set-up time for the last stage. This delay, however, is overshadowed by the advantages the present invention provides.

These advantages are that since the OR function is performed before the last step, last stage flip-flop 230 may be placed closer to the destination system. This reduces the capacitance and, therefore, the time needed to assert or de-assert for DATA_RDY signal 232. As such, a synchronous signal 232 is provided in less time. The only recognizable sacrifice is a slight decrease in reliability, which in reality is not enough to warrant concern for the proper operation of the synchronizer of the present invention.

The output of OR gate 230 is input to the data input of last stage flip-flop 230. Because the OR function precedes the last stage, this last step is shared by all of the asynchronous source signals. The output of last step flip-flop 228 is DATA_RDY signal 232. The last stage flip-flop, preferably is a D-type flip-flop. The added delay caused by the OR function being after the last stage is eliminated.

The present invention can include more than the two levels of synchronization shown in FIG. 2. Where there are multiple levels of synchronization, the OR gate can be placed anywhere in the circuit after the edge detectors, as long as it is not placed after the last synchronization stage.

Figure 3:
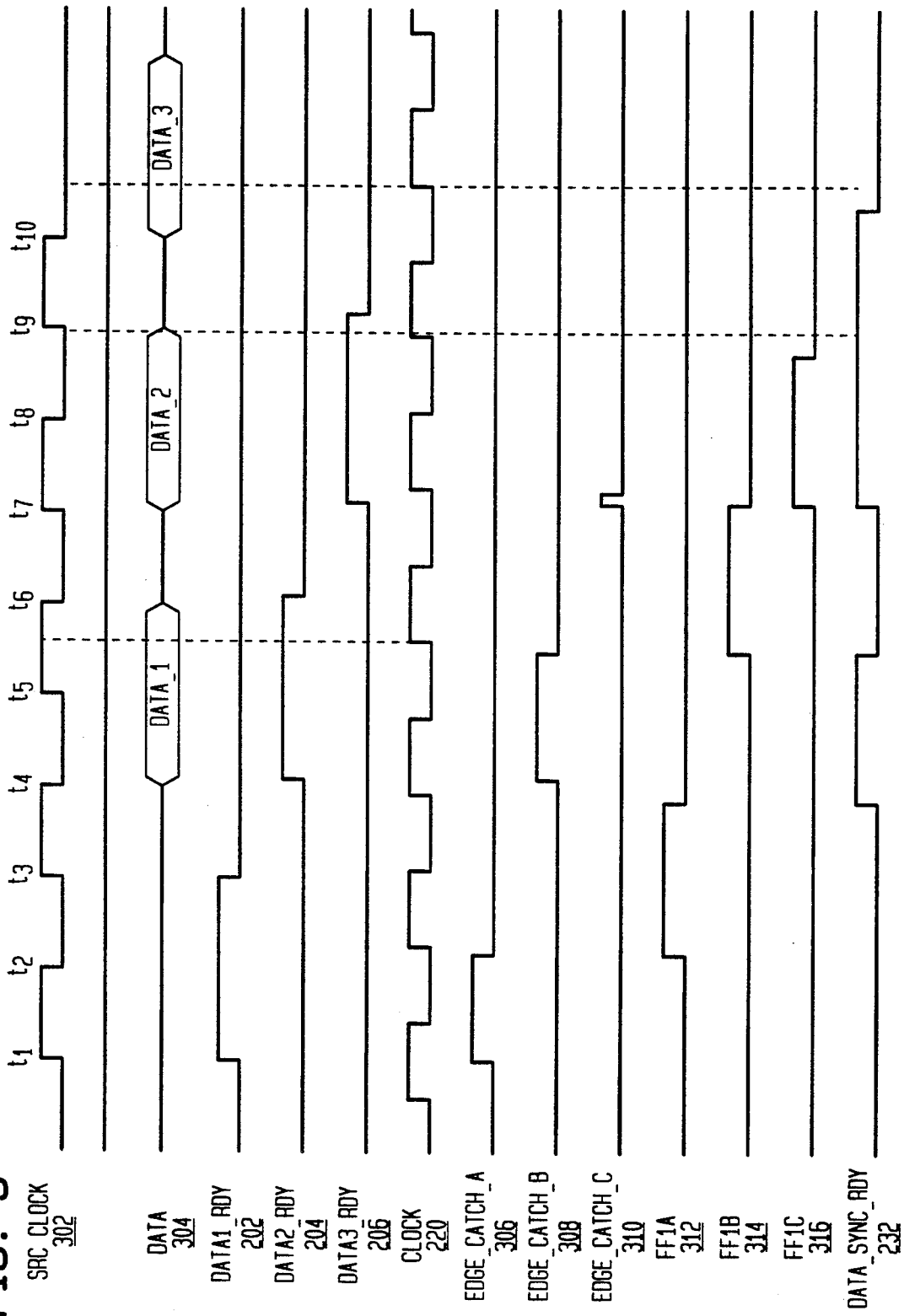
FIG. 3 is a timing diagram for the synchronizer of the present invention that is shown in FIG. 2.

Referring now to FIG. 3, the timing diagram for the operation of the synchronizer of the present invention as shown in FIG. 3 is illustrated.

Clock signal 302 is the clocking signal for the source domain, and, therefore, is the clocking signal for DATA1_RDY signal 202, DATA2_RDY signal 204, and DATA3_RDY signal 206. In the representative embodiment, each data package is two source clock periods in length and the data ready signal for each data package is asserted three source clock periods prior to when the data package is ready. The timing relationship between the data package and the assertion of the corresponding data ready signal is known, and depends on the number of stages of synchronization to take place according to the present invention. The more stages of synchronization, the earlier the data ready signal must be asserted. In the representative embodiment, there is one source clock period between each data package.

When DATA1_RDY signal 202 is asserted at t1, TRUE signal 208, which is input to the data input of edge detector 214, is asserted. This will cause EDGE_CATCH_A signal 306 to be asserted at t1. EDGE_CATCH_A signal 306 will be de-asserted on the next rising edge of destination system clock signal 220 because the signal output from the inverting output of flip-flop 222 will clear edge detector 214.

FFIA signal 312, which is output from flip-flop 222, will be asserted at the de-assertion of EDGE_CATCH_A signal 306. FFIA signal 312 will be asserted for one clock period of the destination system clock. As shown in FIG. 3, FFIA signal 312 will be asserted from after t2 to just before t4.

DATA_RDY signal 232 will be asserted one destination system clock period after FFIA signal 312 is asserted, which is just before t4. The DATA_1 package is ready at t4. On the next rising edge of the destination system clock signal, during t5, the DATA_1 package is obtained by the destination system and DATA_RDY signal 232 is de-asserted.

This same type of operation takes place with regard to the destination system obtaining the DATA_2 package and the DATA_3 package. Therefore, the same processing functions are performed with regard to DATA2_RDY signal 204, edge detector 216, EDGE_CATCH_B signal 308, flip-flop 224, and FFIB signal 314; and DATA3_RDY signal 206, edge detector 218, EDGE_CATCH_C signal 310, flip-flop 226, and FFIC signal 316. Accordingly, the DATA_2 package is obtained during t8 and the DATA_3 package is obtained during t10.

As can be seen in FIG. 2, the DATA_2 package is not lost, even though it is ready at t7 and it is followed immediately by the rising edge of the destination system clock signal which will cause the DATA_2 package to be obtained by the destination system.

The above process guarantees that each input signal 202, 204 and 206 is synchronized into exactly one synchronizer output pulse, regardless of the length of the input source signal. As such, the output signal, DATA_RDY signal 232 will be asserted for exactly one cycle for each input source signal that is asserted. For example, if DATA1_RDY signal 202 and DATA2_RDY signal 204 shared the same synchronizer, then the pulses would align in such a manner that DATA2_RDY signal 204 would be lost and only one pulse on the synchronizer output would exist. The present invention avoids the problem by using a separate edge detector, edge detectors 214, 216, and 218, with each of the each of the source inputs 202, 204 and 206.

The terms and expressions which are employed herein are used as terms of expression and not of limitation. And, there is no intention, in the use of such terms and expression, of excluding the equivalents of the features shown, and described, or portions thereof, it being recognized that various modifications are possible within the scope of the invention.

What is claimed is:

1. A N-stage synchronizer for generating a synchronous signal that is derived from a plurality of asynchronous signals, where $N \geq 2$, N is a positive integer comprising:
   at least one first synchronizer stage for each of the plurality of asynchronous signals, the at least one first synchronizer stage for receiving the asynchronous signal input thereto and for outputting a first signal according to a time domain of the synchronous signal being generated;
   logic gate that receives as inputs the first signal from the at least one first synchronizer stage corresponding to each of the plurality of asynchronous signals, the logic gate also for outputting a second signal;
   at least one second synchronizer stage for receiving the second signal according to the time domain of the synchronous signal being generated; and
   a clock signal in the time domain of the synchronous signal being generated for controlling the timing of the at least one first and at least one second synchronizer stages wherein the at least one second synchronizer stage outputs the synchronous signal.

2. The N-stage synchronizer as recited in claim 1, wherein each of said at least one first synchronizer stage includes a flip-flop.

3. The N-stage synchronizer as recited in claim 2, wherein the flip-flop includes a D-type flip-flop.

4. The N-stage synchronizer as recited in claim 1, wherein the logic gate is an OR gate.

5. The N-stage synchronizer as recited in claim 1, wherein each of said at least one second synchronizer stage includes a flip-flop.

6. The N-stage synchronizer as recited in claim 5, wherein the flip-flop includes a D-type flip-flop.

7. The N-stage synchronizer as recited in claim 1, further comprising a plurality of edge detectors, each one of the plurality of edge detectors receiving as an input one of the plurality of asynchronous signals, each one of the plurality of edge detectors also having an output coupled to a corresponding one of the at least one first synchronizer stages.

8. The N-stage synchronizer as recited in claim 7, wherein each edge detector includes a flip-flop.

9. A N-stage synchronizer for generating a synchronous signal that is derived from a plurality of asynchronous signals, where $N \geq 2$, N is a positive integer, comprising:
   a set of $N-1$ synchronizer stages for each of the plurality of asynchronous signals, each set of $N-1$ synchronizer stage for receiving one of the plurality of asynchronous signals input thereto and for outputting a first signal according to a time domain of the synchronous signal being generated:
   logic gate that receives as inputs the first signal from each set of $N-1$ synchronizer stages corresponding to the plurality of asynchronous signals, the logic gate also for outputting a second signal;
   Nth synchronizer stage for receiving the second signal according to the time domain of the synchronous signal being generated; and
   a clock signal in the time domain of the synchronous signal being generated, the clock signal for controlling timing of the N synchronizer stages wherein the Nth synchronizer stage outputs the synchronous signal.

10. The N-stage synchronizer as recited in claim 9, wherein each of the N synchronizer stages includes a flip-flop.

11. The N-stage synchronizer as recited in claim 10, wherein the flip-flop includes a D-type flip-flop.

12. The N-stage synchronizer as recited in claim 9, wherein the logic gate includes an OR gate.

13. The N-stage synchronizer as recited in claim 9, further comprising a plurality of edge detectors, each one of the plurality of edge detectors receiving as input one of the plurality of asynchronous signals, each one of the plurality of edge detectors having an output coupled to a particular stage of the corresponding set of $N-1$ synchronizer stages.

14. The N-stage synchronizer as recited in claim 13, wherein each edge detector includes a flip-flop.

15. A method for generating a synchronous signal from a plurality of asynchronous signals, comprising the steps of:
   transmitting each asynchronous signal to a respective set of $N-1$ synchronization stages, where $N \geq 2$, N is a positive integer, the timing for each of the respective sets of $N-1$ synchronization stages being in a time domain of the synchronous signal being generated, each one of the respective $N-1$ synchronization stages producing an output;
   inputting to a logic gate the outputs of the respective sets of $N-1$ synchronization stages, with the logic gate producing a logic gate output; and inputting the logic gate output to an Nth synchronization signal stage, the timing for the Nth synchronization signal stage being in the time domain of the synchronous signal being generated, and generating the synchronous signal at the output of the Nth synchronization signal stage.

16. The method as recited in claim 15, wherein each of the N synchronization stages includes a flip-flop.

17. The method as recited in claim 16, wherein each of the N synchronization stages includes a D-type flip-flop.

18. The method as recited in claim 15, wherein the logic gate includes an or gate.

19. A method for generating a synchronous signal from a plurality of asynchronous signals, comprising the steps of:

operating at least one first synchronization stage to receive each one of the plurality of asynchronous signals and to output a respective first signal therefrom, the timing for each of the at least one first synchronization stage being in a time domain of the synchronous signal being generated;

inputting to a logic gate the respective first signal of each of the at least one first synchronization stages, the logic gate producing a second signal at its output; and operating at least one second synchronization stage to receive the second signal and to generate the synchronization signal, the timing for the at least one second synchronization stage being in the time domain of the synchronous signal being generated.

20. The method as recited in claim 19, wherein the step of operating the at least one first synchronization stage includes operating a flip-flop.

21. The method as recited in claim 20, wherein the step of operating the at least one first synchronization stage includes operating a D-type flip-flop.

22. The method as recited in claim 19, wherein the step of operating the at least one second synchronization stage includes operating a flip-flop.

23. The method as recited in claim 22, wherein the step of operating the at least one second synchronization stage includes operating a D-type flip-flop.

24. The method as recited in claim 19, wherein the logic gate includes an OR gate.

25. The method as recited in claim 19, wherein the method further comprises the step of using an edge detector before each of the at least one first synchronization stage.

* * * * *